Patented Sept. 21, 1926.

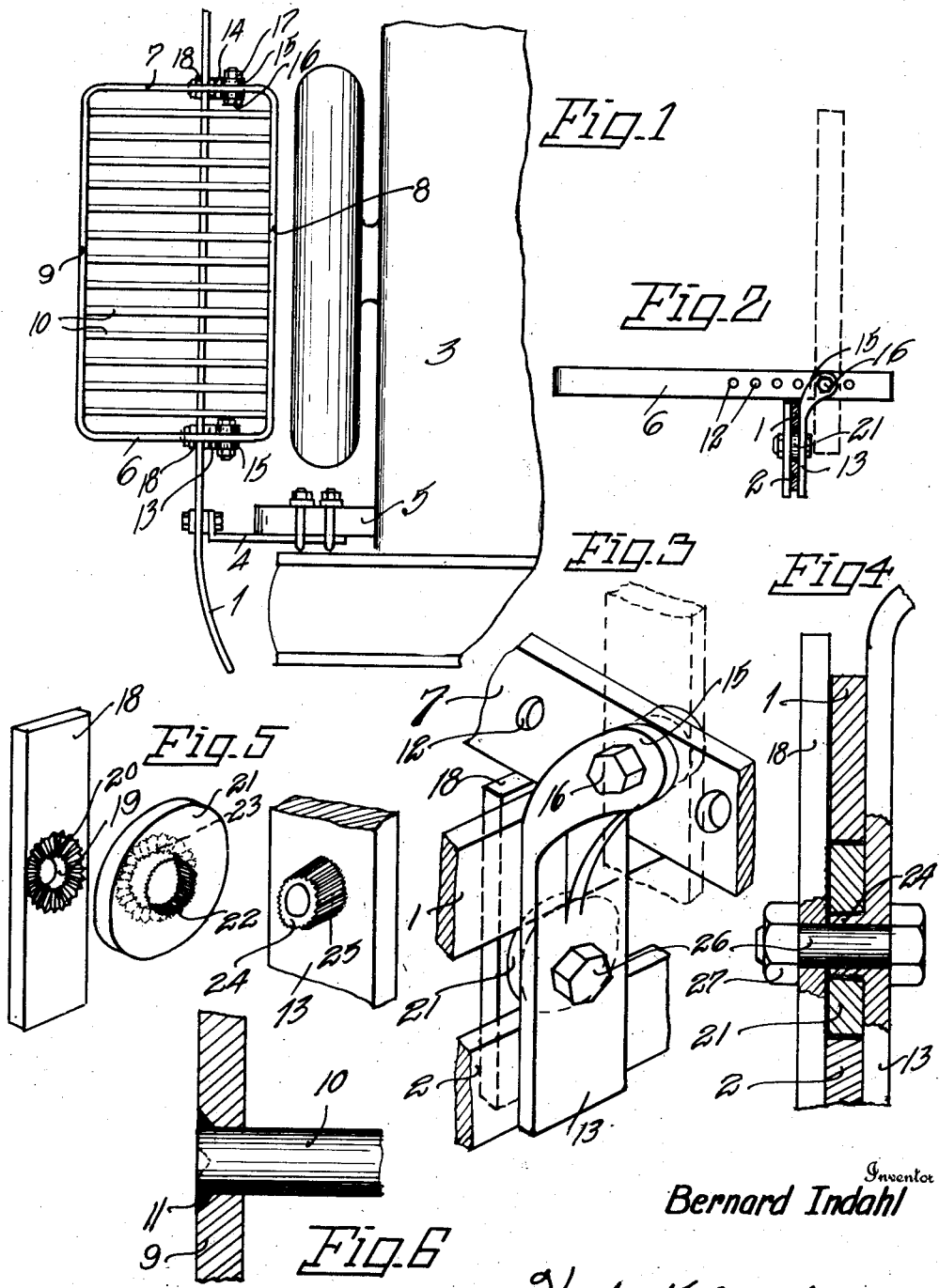

1,600,335

UNITED STATES PATENT OFFICE.

BERNARD INDAHL, OF SPOKANE, WASHINGTON.

LUGGAGE CARRIER.

Application filed May 22, 1926. Serial No. 110,993.

My present invention relates to an improved luggage carrier for use with automotive vehicles, and while applicable for use with various parts thereof, is especially designed for attachment to the rear bumper of such vehicles.

By the utilization of my invention I provide a device of this character which may with facility be attached to the rear bumper and rigidly held thereon to prevent rattling and displacement; which is adjustable for use with various sizes of bumpers employing a pair of vertically arranged rails; which is well braced in horizontal position for use in supporting a load; and which may readily be released, turned to inoperative position, and secured in such position when not required for customary use. Due to the use of a minimum number of parts, simplicity in construction and operation, the device may be manufactured in quantities at low cost of production, and manipulated for attachment or detachment without the necessity for skilled labor or special tools.

The invention consists in certain novel combinations and arrangements of parts as will hereinafter be more fully set forth and claimed. In the accompanying drawings I have illustrated one complete example of the physical embodiment of my invention wherein the parts are combined and arranged in accordance with the best mode I have thus far designed for the practical application of the principles of my invention.

Figure 1 is a top plan view of the luggage carrier of my invention, shown in use and supported on the rear bumper of an automotive vehicle.

Figure 2 is an end view of the luggage carrier in position for use (showing also by dotted lines its position when not in use) and disclosing its mode of attachment to the bumper which latter is shown in vertical section.

Figure 3 is a perspective view showing one of the carrier brackets attached to the bumper.

Figure 4 is a vertical sectional detail view through one of the duplicate locking devices for the carrier and bumper.

Figure 5 is a view showing in perspective and separated three interlocking members of the duplicate lock or clamp devices for the carrier.

Figure 6 is a detail view showing the manner of welding the cross rods of the carrier-rack to the rack-frame.

In order that the general arrangement and relation of parts may readily be understood I have shown in Figure 1 the device of my invention attached at the rear of the automotive vehicle of which the rear bumper is used to support the carrier. The bumper is of the type utilizing a pair of vertically arranged flat, vertically spaced upper and lower rails indicated as 1 and 2 respectively. The bumper is disposed transversely of the vehicle indicated as a whole by the numeral 3, and end attaching plates 4 for the bumper are bolted to the car frame 5 or other suitable support in usual manner.

The carrier is preferably in the form of a flat, rectangular rack disposed when in use in horizontal position above the bumper and extending transversely of the vehicle. The rectangular frame of the rack comprises end bars 6 and 7 and front and rear bars 8 and 9 respectively. The front and rear bars which are preferably of flat vertically arranged plates, are joined by spaced, parallel rack rods 10 having their respective ends welded at 11 in the front and rear bars of the frame, to form a rigid supporting structure for suitable loads to be carried thereon.

Each of the end bars of the rack is provided with a series of bolt holes 12 alined one with another for use in supporting the rack from the bumper, by means of a pair of duplicate supporting brackets 13 and 14 located at the ends of the rack and disposed in vertical position. The brackets are located at the inner side of the bumper and each bracket is fashioned at its upper end with a pair of perforated lugs 15 which are offset from the vertical plane of the brackets. These perforated lugs 15, which form forked offset ends of the brackets, are utilized to support the rack by means of bolts 16 passed through the perforated forked ends and through alined bolt holes 12 in the end bars 6 and 7 of the rack frame, and nuts 17 on the bolts are utilized to clamp the parts rigidly together.

As seen in Figures 2 and 3 the rack bars 6 and 7 also rest upon the top edge of the two spaced supporting plates 18 of the two brackets, said plates being located at the outer side of the bumper. Thus the rack frame or carrier in addition to being supported on the two alined bolts 16 is also supported by contact of the end bars 6 and 7 on the tops of the supporting plates 18 spaced from the supporting bolts. In this manner a substantial support is afforded for the rack or carrier frame and the load imposed thereon, and the carrier may bodily be adjusted with relation to its two supporting points by selectively using bolt holes 12 in the end bars of the rack for the bolts 16. By moving the rack to the right in Figure 2 it will be seen that the leverage imposed by the load on the carrier at its free edge is decreased, the strain on the bolts 16 is reduced and the weight of the load is more uniformly distributed on the supporting bracket plates 18.

These spaced, vertically arranged supporting plates are used to attach the brackets to the bumper and are located at the outer side of the bumper while the brackets 13 are located at the opposite or inner side of the bumper. Each supporting plate is fashioned at its approximate center with a transverse bolt hole 19, and its inner face, around the bolt hole is corrugated or provided with radiating ratchet teeth 20. Between the bracket and the supporting plate a washer or filler-cam 21 is located and this washer or cam of elliptical shape is also located between the lower face of the upper rail and the upper face of the lower rail of the bumper. The cam washer is fashioned with a tapering opening 22 of larger diameter than the bolt hole 19 of the supporting plate and the wall of this opening is also corrugated. The outer face of the cam washer, around the opening 22 is fashioned with corrugations or radial teeth 23 complementary to the corrugations or teeth 20 of the supporting plate. On the outer side of the brackets 13 and 14 are fashioned open bosses 24 having exterior tapered and corrugated annular faces 25 complementary to the toothed opening 22 of the washer 21.

These parts it will be apparent are designed to interlock and be clamped together by means of a clamp bolt 26 and its nut 27, a bolt and nut being employed for each bracket. In assembling the parts the washer is placed between the upper and lower rails of the bumper and turned to position so that its edge will frictionally engage the lower face of the upper rail and the upper face of the lower rail with sufficient friction to retain the washer in place. The corrugated boss of the bracket is then passed through the complementary tapered opening in the washer; the supporting plate is applied to the outer faces of the bumper rails with its corrugated portion 20 engaging the complementary corrugated face of the washer; the bolt is passed through bracket, its boss and the supporting plate, and the nut 27 is then turned home to secure the parts together. In this manner the brackets and supporting plates are rigidly secured to the bumper as supports for the rack or carrier and relative movement or displacement of the vertical supporting plates, the cam-washers, and the brackets, to one another or with relation to the bumper is prevented.

When the use of the rack is not desired in its horizontal position, the nuts 17 may be loosened to permit turning the rack to dotted position in Figure 2, or in Figure 3, and the nuts may then be tightened to clamp the rack in upright position as desired.

Having thus fully described my invention, what I claim as new and desire to secure by Letters Patent is:—

1. The combination with a pair of brackets having offset perforated lugs and a supporting element, of a carrier-rack having end bars and bolts passing through said bars and perforated lugs, supporting-plates spaced from said perforated lugs in position to support the rack, and means for fastening said brackets and plates to the supporting element.

2. The combination with a bumper comprising upper and lower spaced rails, of a pair of brackets and means thereon for supporting a rack-carrier, a pair of supporting plates in position to receive a portion of the weight of the rack-carrier and a washer between each bracket and its complementary plate for co-action with the bumper rails, and fastening bolts for said brackets, washers, and supporting plates.

3. The combination with a bumper comprising spaced rails, of a rack and a pair of spaced brackets for supporting the rack above the bumper, a perforated boss on each bracket, a washer on each boss for frictional contact with the bumper rails, a supporting plate for the rack complementary to each bracket, and fastening bolts for said plates, washers and brackets.

4. A fastening device for a luggage carrier comprising a bracket having an exteriorly corrugated perforated boss, a cam-washer thereon having complementary interior corrugations, a supporting plate having a bolt hole and radial corrugations complementary to those of the cam-washer, and a fastening bolt passed through the bracket, boss and supporting plate.

In testimony whereof I affix my signature.

BERNARD INDAHL.